(12) United States Patent
Brunson

(10) Patent No.: US 7,746,997 B2
(45) Date of Patent: Jun. 29, 2010

(54) INTERACTIVE TELEPHONY TRAINER AND EXERCISER

(75) Inventor: Gordon R. Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1271 days.

(21) Appl. No.: 11/245,543

(22) Filed: Oct. 7, 2005

(65) Prior Publication Data

US 2007/0116207 A1   May 24, 2007

(51) Int. Cl.
   H04M 3/00       (2006.01)
   H04M 5/00       (2006.01)
(52) U.S. Cl. ................. 379/265.02; 434/365; 434/323; 434/362; 434/169
(58) Field of Classification Search ............ 379/265.02; 434/365, 323, 362, 169
   See application file for complete search history.

(56) References Cited

U.S. PATENT DOCUMENTS

| | | | | |
|---|---|---|---|---|
| 5,757,644 | A | * | 5/1998 | Jorgensen et al. ............. 700/83 |
| 6,561,812 | B1 | | 5/2003 | Burmester et al. |
| 6,671,358 | B1 | * | 12/2003 | Seidman et al. .......... 379/93.12 |
| 7,110,525 | B1 | * | 9/2006 | Heller et al. ........... 379/265.11 |
| 2007/0055766 | A1 | * | 3/2007 | Petropoulakis et al. ...... 709/224 |

FOREIGN PATENT DOCUMENTS

WO     02/37697    5/2002

OTHER PUBLICATIONS

European Search Report and Opinion for European Patent Application No. 06254448.1, mailed Sep. 3, 2007.
First Examination Report for Indian Patent Application No. 1848/CHE/2006, mailed Nov. 5, 2008.
Notification of the First Official Action for Chinese Patent Application No. 200610139545.6, mailed Apr. 3, 2009.
Examination Report for European Patent Application No. 06254448.1, mailed Mar. 10, 2008.
Background of the above-captioned application (previously provided).
Notification of the Second Official Action (including translation) for Chinese Patent Application No. 200610139545.6, mailed Nov. 6, 2009.
Written Notification (including translation) for Japanese Patent Application No. 2006-274771, mailed Oct. 13, 2009.
Background of the above-captioned application (previously provided), Oct. 7, 2005.

* cited by examiner

*Primary Examiner*—Quynh H Nguyen
(74) *Attorney, Agent, or Firm*—Sheridan Ross P.C.

(57) ABSTRACT

A telephony trainer and exerciser allows a user of the telephony system to practice and train using the telephony system and its various features. The telephony trainer and exerciser system provides at least one automated responder, and more preferably, a plurality of automated responders that can be called by the user, thereby allowing the user to practice different operating features of the telephony system. Using a recognizer agent, the automated responders are able to distinguish between commands given by the user and similar statements given by another automated responder. The trainer and exerciser system optionally includes a correlator agent to provide an audio and/or written transcript of the practice session. A coaching feature is also optionally provided to assist a user in operating the trainer and exerciser and/or the telephony system.

27 Claims, 13 Drawing Sheets

US 7,746,997 B2

INTERACTIVE TELEPHONY TRAINER AND EXERCISER

FIELD OF THE INVENTION

The present invention relates to novel telephony system software, and more particularly, to software that allows a user of a telephony system to practice the various features of the telephony system.

BACKGROUND

People desiring to use a telephony system, such as a person wanting to make a conference call, may undertake to attempt a practice session prior to actually making the scheduled call to the formal participants. As for example, an individual at a company may occasionally have a need to conduct a conference call where a number of other parties are to be joined on the conference call. If never having made such a call before, the person may, out of ignorance, not understand the complexities involved in making such call until actually attempting the call to the conference call parties. Such an event can result in multiple events of hanging-up on the call participants and potentially aggravating not only the person attempting to set-up the call, but the other participants may grow impatient or weary of being cut-off.

Accordingly, people desiring to make a proper conference call will often either ask somebody else for assistance, or alternatively, they will attempt to practice setting-up a conference call. Such attempts to practice may, for example, entail using a person's own cell phone as a test phone, and/or asking one or more co-workers or friends to act as test subjects while the person attempting the call operates the phone to connect the various test subjects. Such attempts are often time consuming to numerous individuals, and may still leave the person attempting the call with only the most minimum level of confidence in properly connecting the parties.

Furthermore, even slightly more sophisticated calling features may be completely out of the realm of consideration by the person attempting the call. For example, telephony system features that allow the ability to drop and add callers, place a sub-conference call, place a call in whisper mode, and other such features may be all but useless because the user has never had the opportunity to properly practice such features.

The prior art includes voice mail systems wherein a caller is directed to a voice mail box and is able to key entries into the phone for options, such as listening to the system replay the caller's message before sending the message to the receiving party. In addition, the prior art includes interactive voice response systems, wherein the caller is prompted to say a word or phrase, and then the system analyzes the caller's statement and moves forward with providing information to the caller or prompting the caller for further additional voice information. Such systems are commonly used in the airline industry and allow the caller to check departure and arrival times. However, such systems fail to allow a person to interact with the telephony system to practice the various features of the system.

Accordingly, there is a need for a telephony trainer and exerciser system that allows a person desiring to make a call to practice using the telephony system. In addition, there is a need for a telephony trainer and exerciser system that offers interactive responses from the test subjects so that the caller can conduct a meaningful practice session. In addition, there is a need for a telephony trainer and exerciser system that provides a transcript so that the person practicing the call can understand the nature of the practice session from the test subject's perspective and assess whether the practice call was professionally performed. In addition, there is a need for a coaching function that provides instruction to a user of the telephony system.

SUMMARY

The present invention comprises a telephony trainer and exerciser that allows a user of the telephony system to practice and train using the telephony system and its various features. The telephony trainer and exerciser system provides at least one automated responder, and more preferably, a plurality of automated responders that can be called by the user, thereby allowing the user to practice different operating features of the telephony system. In accordance with embodiments of the present invention, the responders are able to distinguish between commands given by the user and similar statements given by another responder.

The present invention allows a telephony system customer to practice the various features of the telephony system to build skills and/or gain confidence in using the telephony system. The present invention also has application to allowing a phone company to test the features of the telephony system without using multiple employees. In addition, the present invention can be used to check both domestic and international connectivity, as well as test and/or practice or train telephone company employees on the capability of their company's telephony system.

Accordingly, a telephony trainer and exerciser system is provided for allowing a user to practice features of a telephony system using an access node, such as any type of phone. Thus, in accordance with embodiments of the present invention, the trainer and exerciser system comprises a plurality of automated responders in communication with the telephony system and available for access by the user using the access node. In addition, the trainer and exerciser system comprises a recognizer agent associated with the automated responders for distinguishing between a user's command and a statement of at least one of the plurality of automated responders. The plurality of responders will perform a first function for a first command or token instruction provided by the user, but at least one of the plurality of responders will not perform the first function for the same first command or token instruction provided by at least a second of the plurality of responders. As used herein, a "token instruction" refers to a command from a user, whether provided by spoken or tactile (such as by a mouse, stylus, touch screen, touch tone pad, and the like) instruction or otherwise. In accordance with embodiments of the present invention, the trainer and exerciser system may be loaded on one computer or server at one location, or on different servers at different geographic locations. The exerciser and training system may optionally comprise a correlator agent in communication with the plurality of responders, wherein the correlator agent assembles a transcript of a practice session conducted between the user and at least one of the plurality of responders. In addition, the exerciser and training system may optionally comprise a coaching agent in communication with the access node of the user, wherein the coaching agent provides at least a first instruction to the user for using the telephony system.

In accordance with embodiments of the present invention, a method of a user practicing a communication is provided, the method comprising providing at least first and second computer automated responders interconnected to a telephony system. The method further includes engaging the first computer automated responder, engaging the second computer automated responder, and providing a token instruction to at least one of the first and second computer automated responders. The first and second computer automated responders distinguish between the token instruction provided by the user, and the same token instruction provided by the other of the first and second computer automated responders. In addition, the method optionally allows the user to review a practice session by reviewing a transcript and/or listening to a recording of the practice session by way of a correlator agent interconnected to the telephony system, wherein the correlator agent compiles information provided by the user and the first and second computer automated responders. In addition, the method optionally comprises a coaching agent that provides instruction to the user on how to operate the telephony system. The coaching feature can include instruction on using the trainer and exerciser system. The various features of the telephony system can be practiced, including such features as conference calls, whisper calls, private sub-conference calls, dropping, adding, muting, transferring, forwarding, answering, and holding.

In accordance with embodiments of the present invention, an alternate method of a user practicing a communication is provided, the method comprising providing at least first and second computer automated responders interconnected to a telephony system, and providing a correlator agent interconnected to the telephony system, the correlator agent compiling information provided by the user and the first and second computer automated responders. The method further includes the user engaging the first computer automated responder during a practice session, and then engaging the second computer automated responder during the practice session, wherein after the practice session the correlator agent provides the compiled information summarizing the practice session. In accordance with embodiments of the present invention, the method may further comprise reviewing the compiled information by listening to a recording of the practice session, and/or reviewing the compiled information by reading a transcript of the practice session. In accordance with embodiments of the present invention, the method may also further comprise the user providing a token instruction to at least one of the first and second computer automated responders, wherein the first and second computer automated responders distinguish between the token instruction provided by the user, and the same token instruction provided by the other of the first and second computer automated responders.

Various embodiments of the present invention are set forth in the attached figures and in the detailed description of the invention as provided herein and as embodied by the claims. It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

Additional advantages of the present invention will become readily apparent from the following discussion, particularly when taken together with the accompanying drawings.

DETAILED DESCRIPTION OF THE INVENTION

Figure 1:
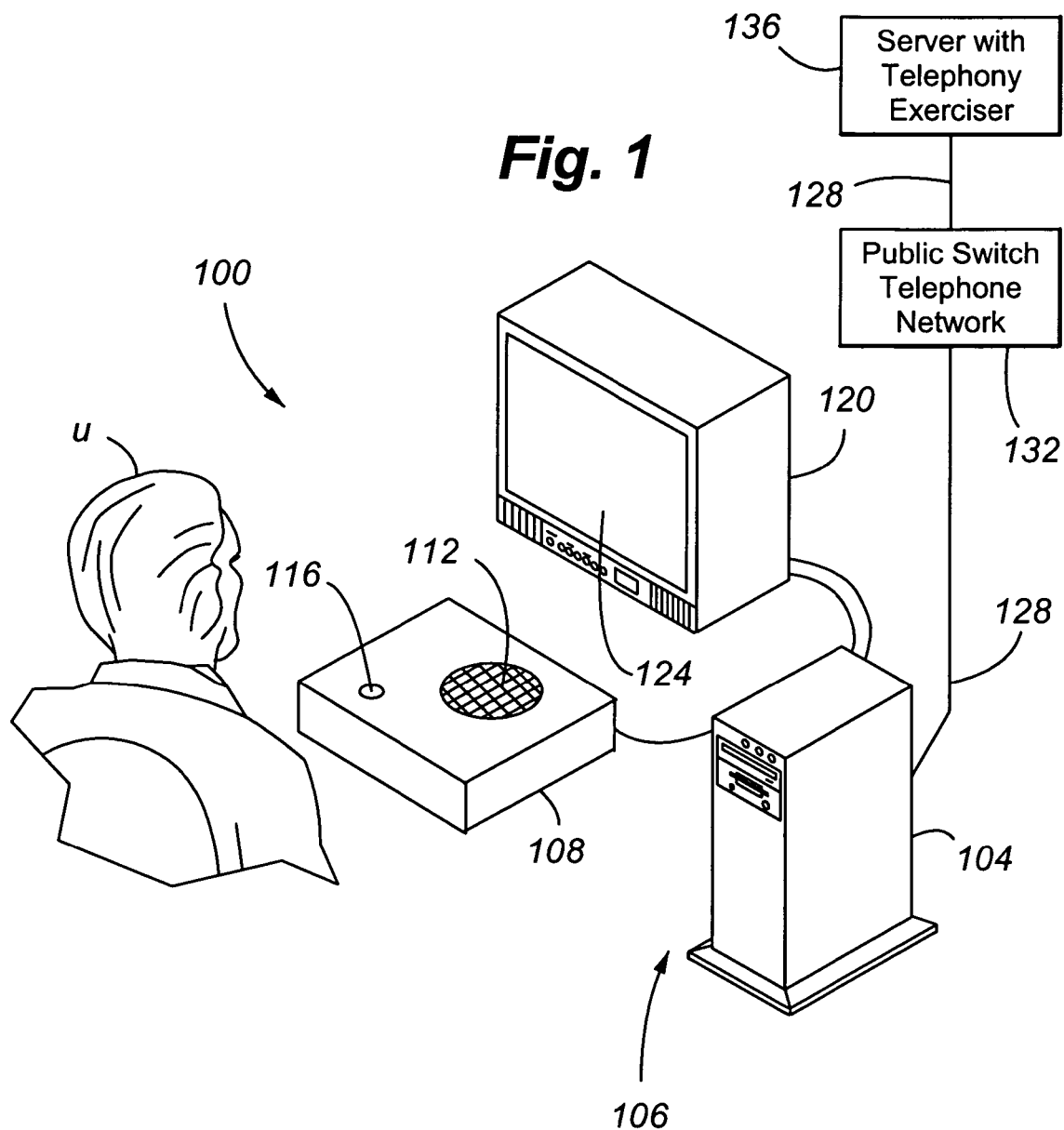
FIG. 1 depicts an interactive telephony trainer and exerciser system according to an embodiment of the present invention.

Referring now to FIG. 1, components of an interactive telephony trainer and exerciser system 100 in accordance with embodiments of the present invention are illustrated. For the interactive telephony trainer and exerciser system 100 shown in FIG. 1, a softphone 106 is employed on a computer 104, such that an audio transceiver 108 is used in combination with the computer 104, where the audio transceiver 108 includes a speaker 112 and a microphone 116. The computer 104 may be a general purpose computer, as for example, a desktop or laptop personal computer (PC). The PC 104 may be interconnected to a monitor 120 having a display screen 124. The system 100 further includes a line 128 that interconnects the computer 104 with softphone 106 to a public switched telephone network 132. For the illustrated example shown in FIG. 1, software of the telephony trainer and exerciser system 100 may be present on a server 136 that is interconnected to the public switched telephone network 132 via line 128. The interactive telephony trainer and exerciser system 100 allows a user U to perform training of the features of a telephony system, and to conduct practice exercises on the telephony system to learn the system and develop confidence in utilizing the features of the telephony system.

Figure 2:
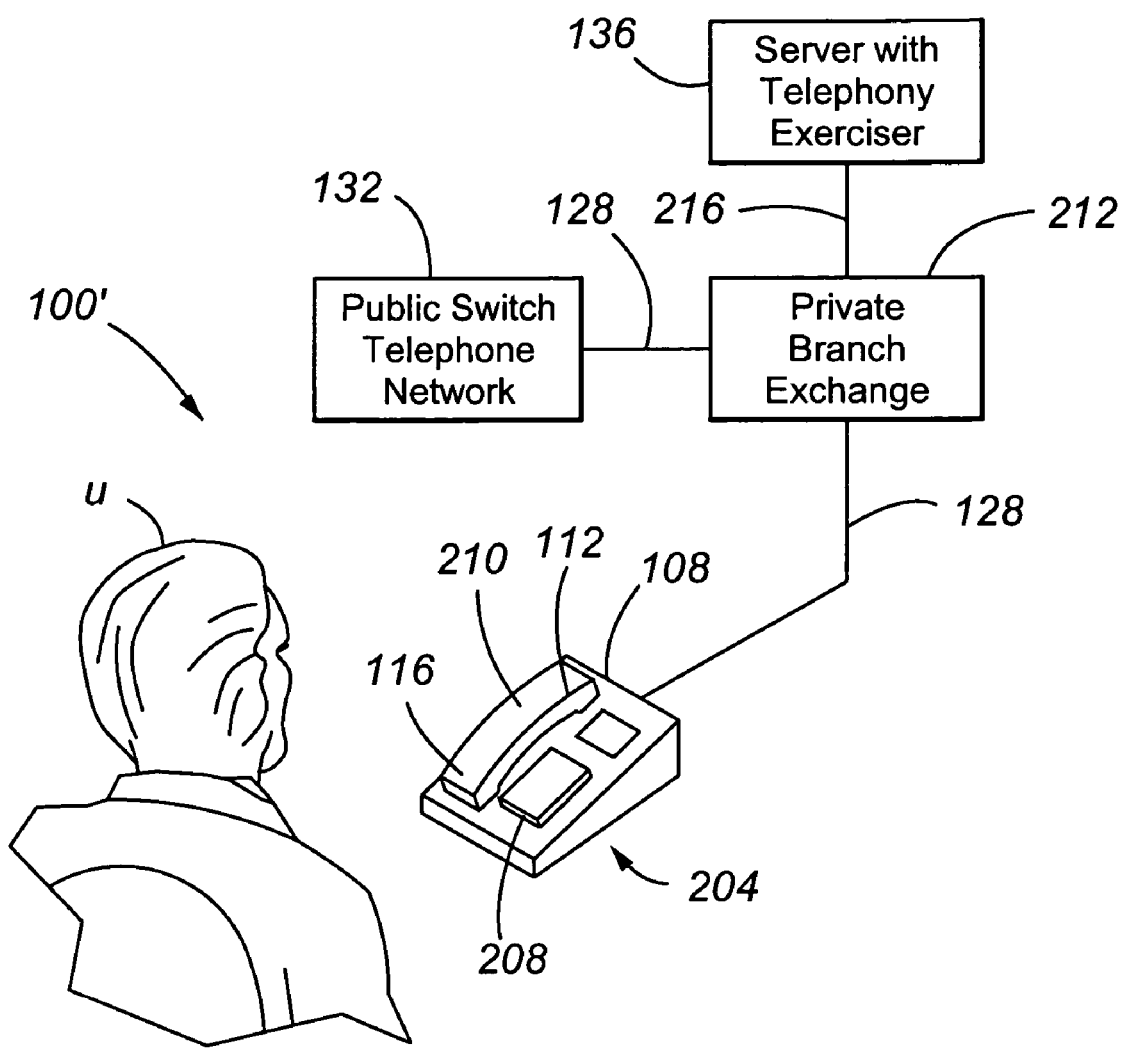
FIG. 2 depicts an alternate interactive telephony trainer and exerciser system according to an embodiment of the present invention.

Referring now to FIG. 2, in accordance with embodiments of the present invention, an interactive telephony trainer and exerciser system 100' is illustrated that comprises a telephone 204 having a control panel 208 and an audio transceiver 108 including a handset 210, where the handset 210 includes a speaker 112 and a microphone 116. For the illustrated embodiment shown in FIG. 2, the telephone 204 is interconnected to a private branch exchange 212 that is interconnected to a public switched telephone network 132 by a line 128. Software of the telephony exerciser system 100' may be present on a server 136 that is interconnected to the private branch exchange 212 via line 216. Here, for the user U to access a responder of the telephony exerciser, the user U calls a telephone number for a computer responder, as described in detail below.

In accordance with embodiments of the present invention, the interactive telephony trainer and exerciser may be implemented as a co-resident ancillary multi-channel application on a voice-mail application server. Accordingly, for companies possessing an existing voice-mail application server, the interactive telephony trainer and exerciser may be implemented on the existing server.

FIGS. 1 and 2 illustrate two possible telephony system configurations that may be employed in conjunction with an interactive telephony trainer and exerciser that comprises the present invention. However, as will be appreciated by those skilled in the art, other configurations are possible and are within the scope of the present invention. As for example, although the various embodiments shown herein are depicted with an audio transceiver associated with either a softphone 106 or regular telephone 204, the present invention has application to alternative systems, such as a system that utilizes only a keyboard to send text messages, and/or to a system that uses video with no audio component. Such systems would be appropriate for people with hearing impairments, such as a deaf person. Furthermore, as additional examples, and without the intent to limit the scope of the present invention, the telephone 204 of FIG. 2 may be a digital phone, analog phone, cell phone, satellite phone, head set, or a speaker phone.

Figure 3A:
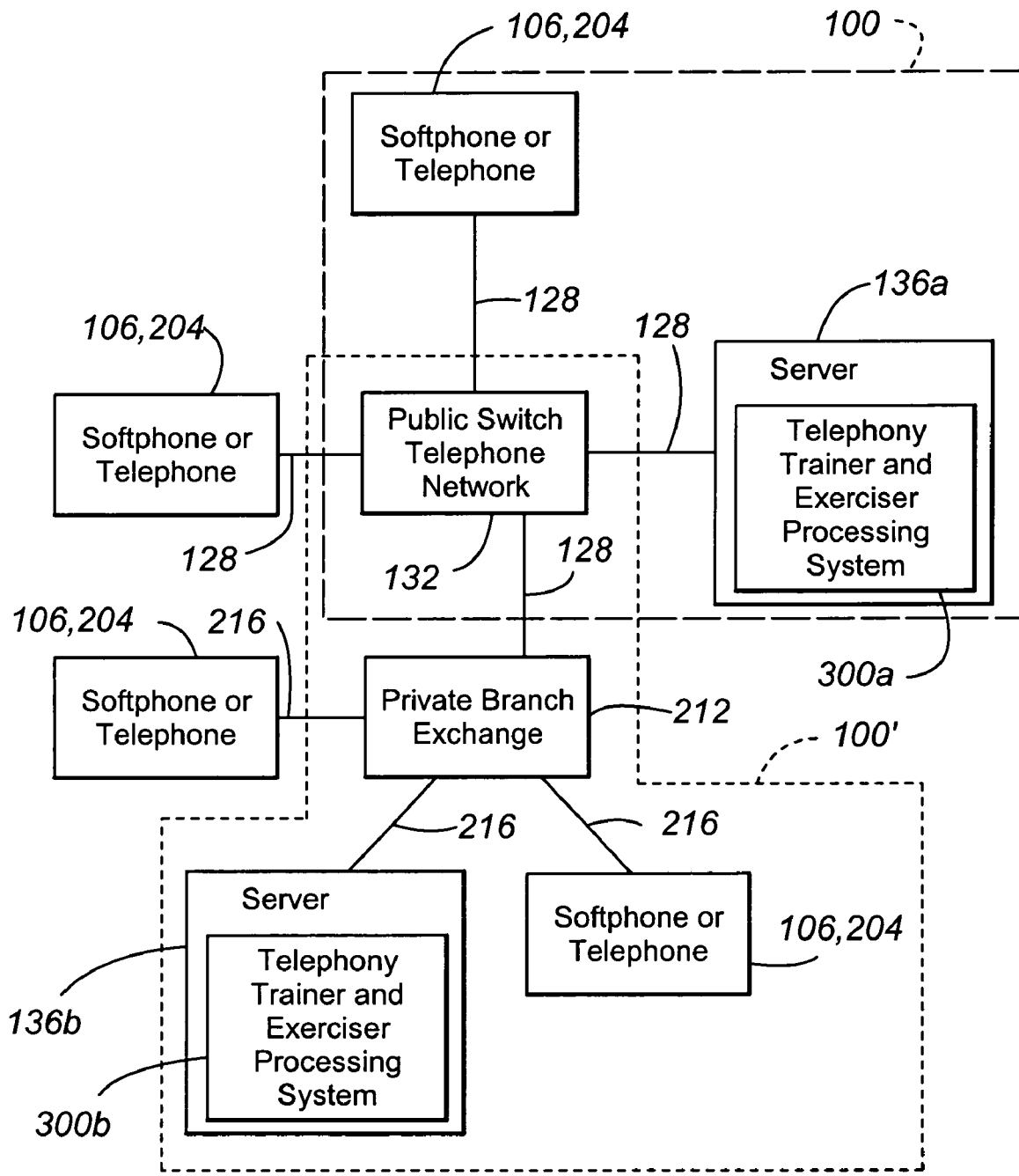
FIG. 3A is a block diagram depicting elements associated with, and/or elements that work in conjunction with an interactive telephony trainer and exerciser system in accordance with embodiments of the present invention.

Referring now to FIG. 3A, a block diagram is shown that illustrates a possible inter connectivity of the interactive telephony trainer and exerciser system 100 with interactive telephony trainer and exerciser system 100'. Here, both systems 100 and 100' are interconnected to the public switched telephone network 132 via lines 128. The public switched telephone network 132 services a plurality of softphones 106 or telephones 204. In addition, a first server 136a is interconnected to the public switched telephone network 132 by a line 128, where the first server 136a includes a first telephony trainer and exerciser processing system 300a. Also interconnected to the public switched telephone network 132 is private branch exchange 212 that includes a plurality of softphones 106 or telephones 204 that it services, and further includes its own server or second server 136b having a second telephony trainer and exerciser processing system 300b. Thus, as those skilled in the art will appreciate, a variety of configurations are possible for the telephony trainer and exercisers, including the use of a plurality of servers interconnected to a public switched telephone network.

In accordance with embodiments of the present invention, the telephony trainer and exerciser processing system 300 preferably comprises software that is loaded on to the server 136 that is in communication with the user's softphone 106 or telephone 204. Alternatively, although not preferred, the interactive telephony trainer and exerciser system 100, 100' may be implemented in firmware, such as by a logic circuit, e.g., an Application Specific Integrated Circuit or ASIC. The interactive telephony trainer and exerciser system 100, 100' interacts with the user and allows the user to practice the features of the telephony system.

Figure 3B:
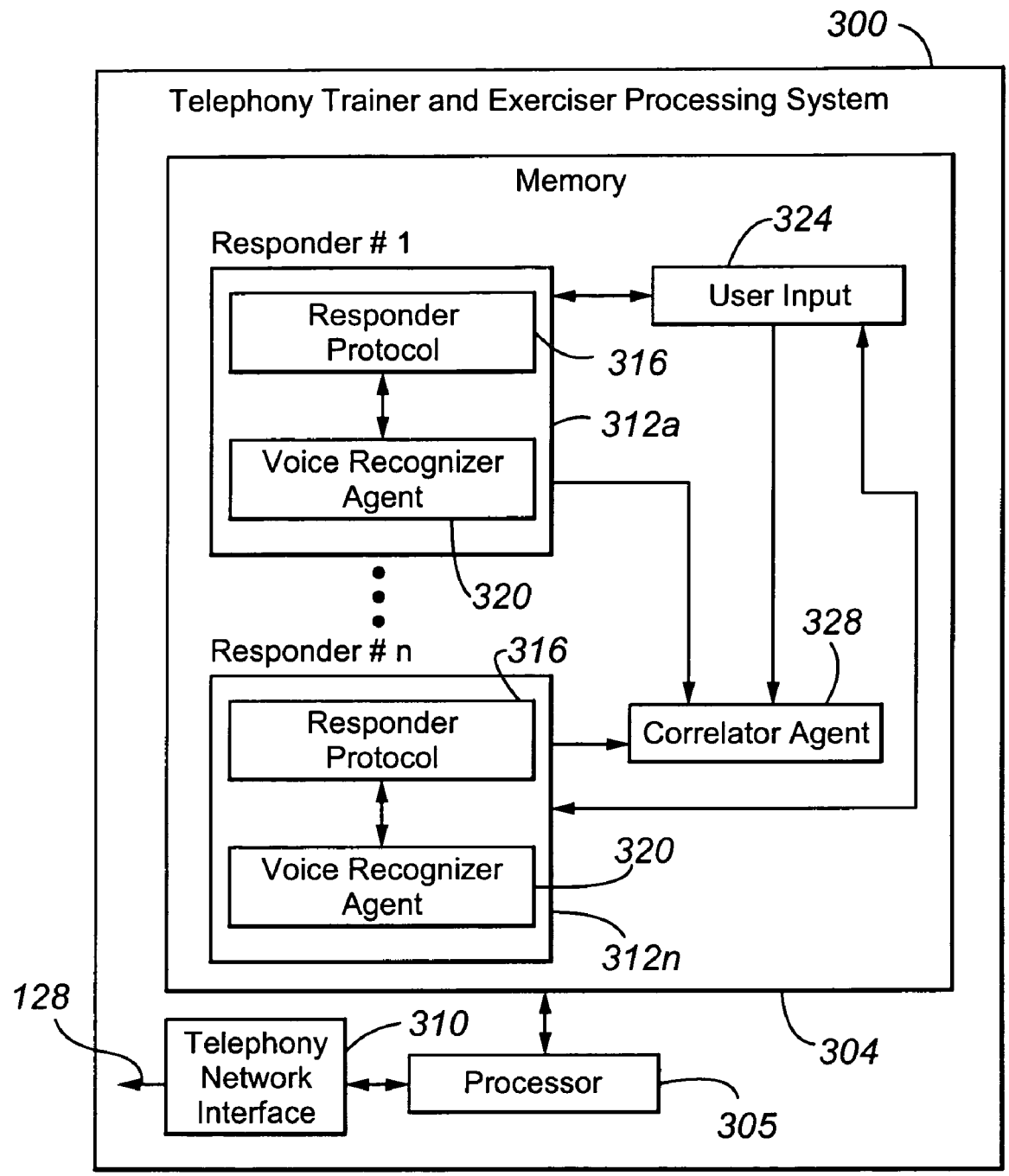
FIG. 3B is a block diagram depicting an interactive telephony trainer and exerciser processing system in accordance with embodiments of the present invention.

Referring now to FIG. 3B, the telephony trainer and exerciser processing system 300 is depicted in greater detail as a software-controlled system, although as noted above, the interactive telephony trainer and exerciser system 100, 100' may be implemented in firmware, such as by a logic circuit. The telephony trainer and exerciser processing system 300 includes memory 304 and processor 305. In addition, the processor 305 of the system 300 may communicate with the telephone network using a telephony network interface 310 and line 128. The telephony trainer and exerciser processing system 300 further preferably includes a plurality of responders, such as responders 312a-n. In accordance with embodiments of the present invention, the responders 312a-n include the responder protocol 316 that may be used for any telephony system, and further include a voice recognizer agent 320. The telephony trainer and exerciser processing system 300 further includes input from the user at 324 that is recognized by the responders 312a-n by using the voice recognizer agent 320. In addition, the system may optionally include a correlator agent 328, as described below.

Referring now to FIGS. 4A-4H, and in accordance with embodiments of the invention, a flow diagram of an example of the responder protocol 316 with the voice recognizer agent 320 for a responder 312a-n of the training and exerciser system 100, 100' is depicted in session 400. In general, the responder 312a-n is essentially a state driven application. In step 404, the training/exercise session 400 begins. In step 408, in response to an incoming phone call to the responder, the responder provides a greeting and also provides a responder identification. For example, the responder may be named "Responder A," "Responder Number One," "Responder Adam," etc. Responder designations are likely to be adopted that provide distinction in enunciation and provide clarity when more than one responder is employed.

In decision diamond 412, the session begins analyzing whether the user has provided a command. If a command is provided, then in decision diamond 432 of FIG. 4B, the session begins identification of the user's command using the voice recognizer agent 320. If a command is not detected, then in step 420 of FIG. 4A, the session provides a capabilities menu to the user. Here, the responder lists the available capabilities of the trainer/exerciser practice session 400. For the embodiment depicted in FIGS. 4A-4H, the trainer/exerciser session 400 allows the user to command the responder to:

enter a standby mode;
    repeat the responder's capabilities;
    hang-up and then subsequently place a call back to the user;
    repeat back statements made by the user; and
    provide on-going commentary wherein the responder essentially continues a dialog.

As discussed in more detail below, other advanced responder capabilities are possible and are within the scope of the present invention. As for example, embodiments of the present invention may comprise customized responders that are made available to users of a specific type of network telephone system, wherein the users can practice more advanced features of the telephone system, such as practicing the system's whisper mode, practicing providing a private subconference, or practicing a variety of other available features of a given telephony system. However, trainer/exerciser session 400 addresses a basic telephone exerciser system that can be used by any user calling any responder from any type of phone.

Figure 4A:
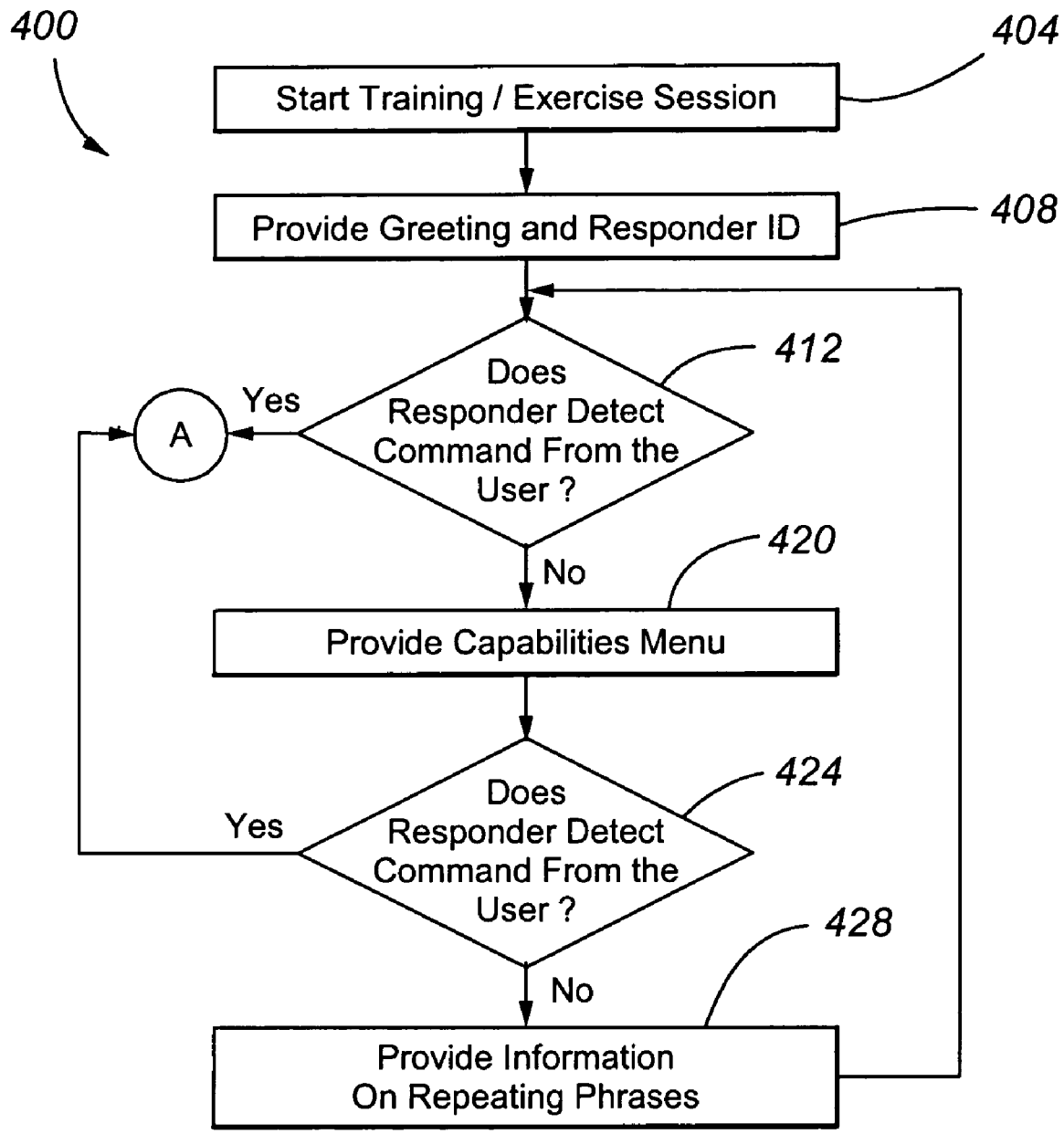
FIGS. 4A-4H are flow diagrams of a sample session with portions of a responder protocol in accordance with embodiments of the present invention.
Figure 4B:
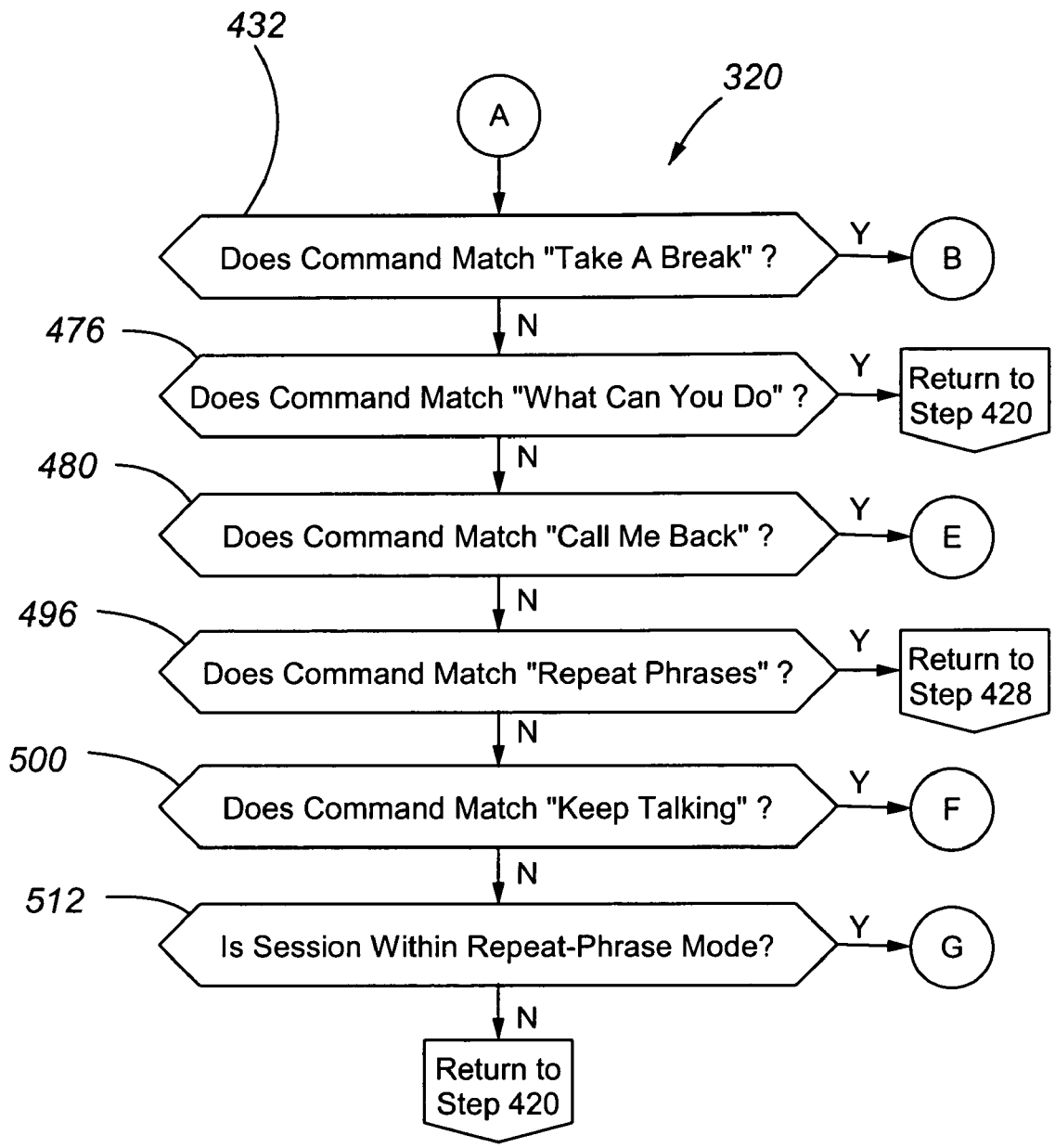

Referring again to FIG. 4A, in decision diamond 424 the responder again maintains analysis for detecting a command from the user, and moves to decision diamond 432 of FIG. 4B if a command is detected. If a command from the user is still not detected, the session 400 defaults in step 428 of FIG. 4A to providing information to the user about the responder repeating phrases of the user. After step 428, the session 400 moves back to detecting a command from the user at decision diamond 412. Assuming that a command is detected, the session moves to identifying the command of the user.

Referring now to FIG. 4B, the session 400 engages the voice recognizer agent 320 at decision diamond 432 and analyzes the command of the user. In decision diamond 432, the session analyzes whether the user provided a command for the responder to enter a standby or break mode, such as by the user stating "timeout" or "take a break." Assuming the user stated the proper command or token instruction of "take a break" as shown in decision diamond 432, then the responder moves to break mode 436 of FIG. 4C.

Figure 4C:
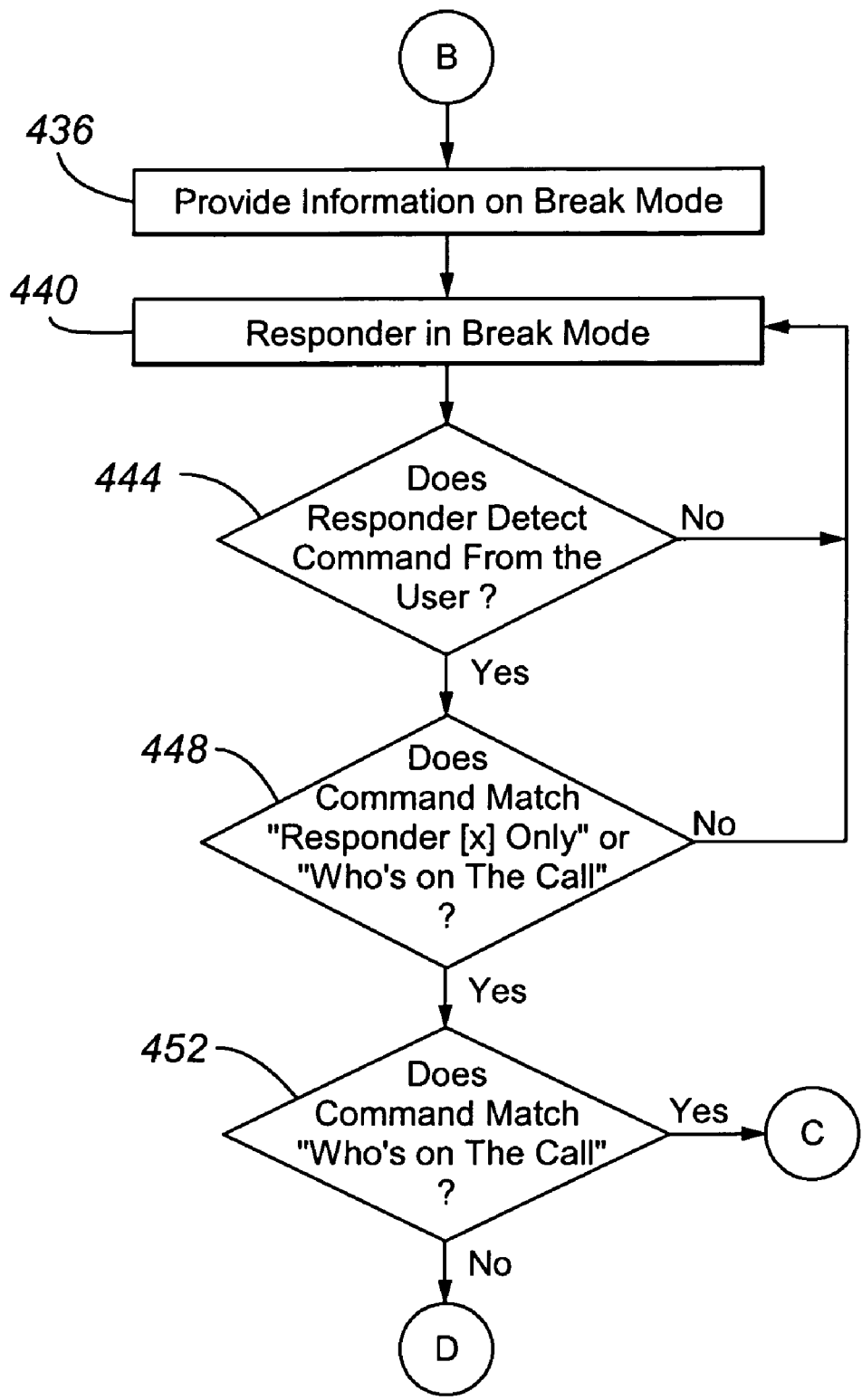

Referring now to FIG. 4C, when placed in break mode in step 436, the responder provides instructions to the user about the break mode. After providing the break mode instructions, the responder moves to break mode, as shown in step 440. In decision diamond 444, the responder attempts to detect a command from the user. If no command is detected, then the responder maintains itself in break mode. If a command is detected in decision diamond 444, then in decision diamond 448, the responder evaluates whether the command given by the user matches a proper token instruction, such as "responder [x] only" or a request for a roll call by the token instruction "who's on the call." For this example session 400, the responder waits for a proper command from the user to trigger an action by the responder, and if a proper command is not given, then the responder maintains itself in break mode, such as by returning to step 440. Once a proper command is given, then in decision diamond 452, the session analyzes whether "who's on the call" was given as the command, and if so, moves to answering the roll call request of the user at step 456 of FIG. 4D.

Figure 4D:
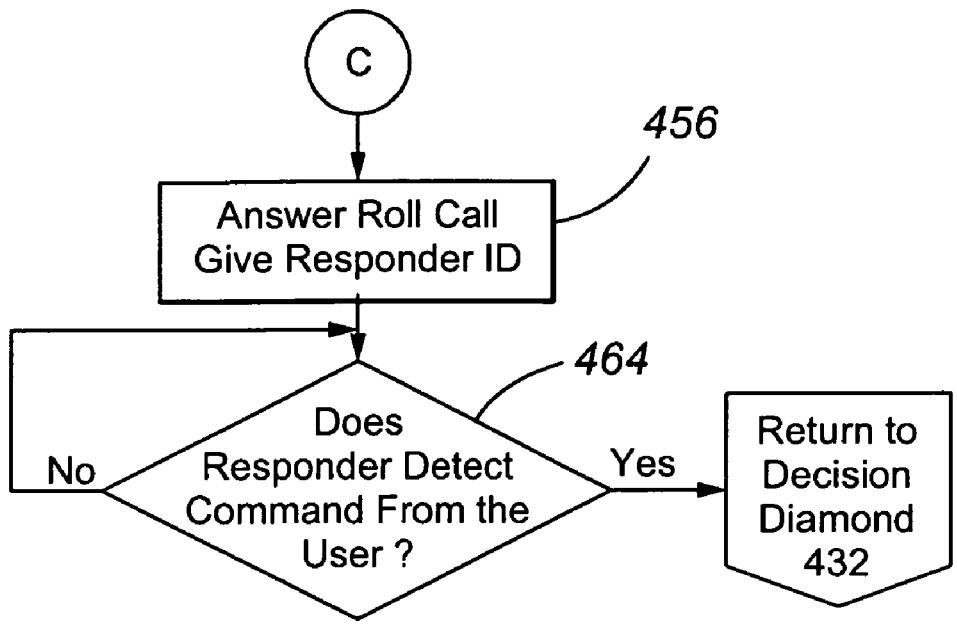

Referring now to FIG. 4D, in step 456 the responder gives its responder identification to the user. Thereafter, in decision diamond 464, the responder again analyzes whether the user has given a command. Once a command is detected, then the session returns to decision diamond 432 of FIG. 4B for identification of the user's command. If no command is given, the session returns to analyzing whether a command was given by the user in decision diamond 464 of FIG. 4D.

Figure 4E:
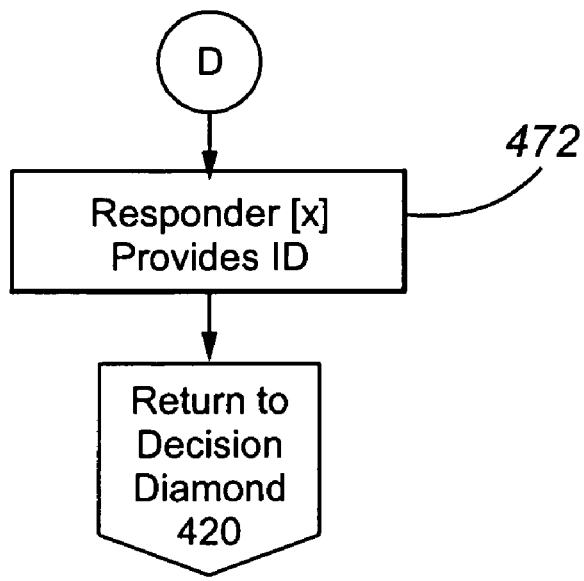

Returning now to FIG. 4C, if at decision diamond 452 the user has not stated "who's on the call," the session moves to step 472 of FIG. 4E because the user has, by default, stated "responder [x] only" where [x] is the identity of this responder. Referring now to FIG. 4E, in step 472 the responder provides its identification, and then the session returns to step 420 where the responder provides the user the responder's capabilities menu, as depicted on FIG. 4A. Of course, this is but one possible routing of the session after the user requests the responder's identification. Accordingly, other alternate routing or process steps are within the scope of the present invention.

Referring back to FIG. 4B, if the break mode is not invoked in decision diamond 432, then in decision diamond 476 the command is checked for matching with the token instruction for moving to the responder's capabilities menu at step 420 of FIG. 4A. If the token instruction "what can you do" is given by the user, then the session moves back to the capabilities menu at step 420. If this command is not detected, then in decision diamond 480 of FIG. 4B, the command is checked as to whether a request to hang up and call back the user was made. If, for example, the user states the required token instruction of "call me back," then at decision diamond step 480, the session moves to the call-back mode.

Figure 4F:
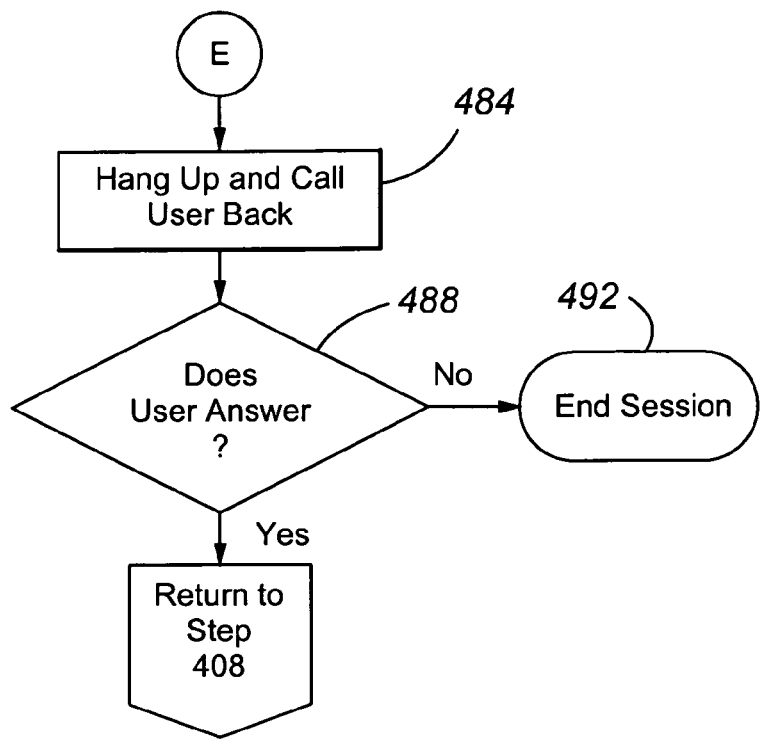

Referring now to FIG. 4F, in step 484 the responder acknowledges the command, then hangs up, and then calls back the user. If the user does not answer in decision diamond 488, then in step 492, the sessions ends with respect to the current responder. If the user does answer, then the responder provides greeting information, such as by returning to step 408 of FIG. 4A.

Referring again to FIG. 4B, if the call-back feature is not invoked in step 480, then in step 496 the session analyzes whether the user has given the command, such as "repeat phrases," for the responder to repeat back statements made by the user. If so, then the session moves to step 428 of FIG. 4A and provides instructions to the user on repeating phrases, and it is noted that additional description about the repeat-phrases mode is provided below.

Figure 4G:
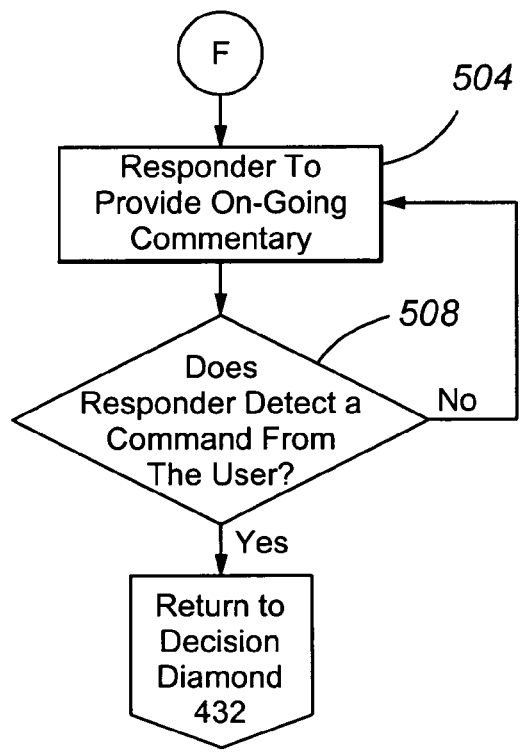

If the repeat phrases mode is not invoked in decision diamond 496 of FIG. 4B, then at decision diamond 500 the session analyzes whether the user has given the command for the responder to provide on-going commentary, such as by stating the token instruction "keep talking." If the "keep talking" token instruction is given, then as shown in FIG. 4G, in step 504 the responder provides an on-going commentary or dialog, and then in decision diamond 508 continues to analyze whether the user has given another command. If another command is given, then the session moves back to the command identification process by returning to decision diamond 432 of FIG. 4B.

Figure 4H:
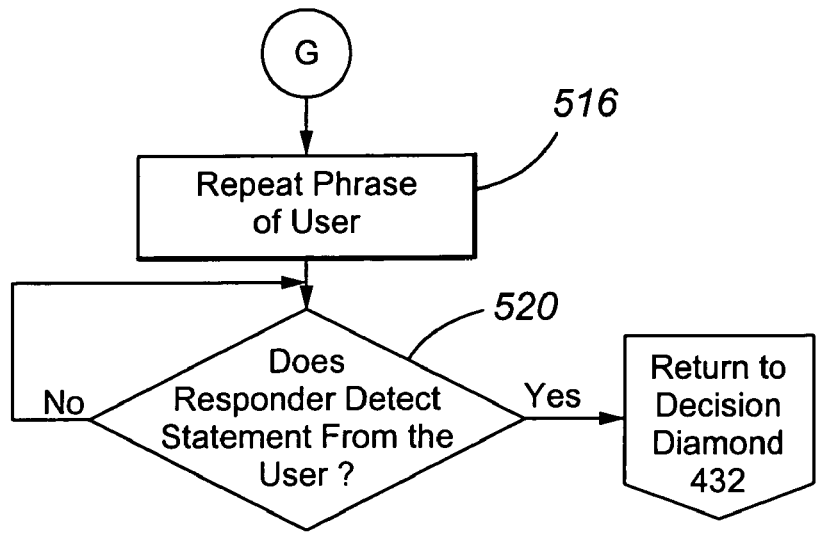

Referring again to FIG. 4B, if the command to provide an on-going commentary is not detected at decision diamond 500, then at decision diamond 512 the session assesses whether it is in the repeat-phrases mode and if so, moves step 516 of FIG. 4H to repeat the phrases of the user. Referring now to FIG. 4H, after repeating the phrase of the user in step 516, in step 520 the session again analyzes whether the user has made a statement. Once a statement has been made, then the session returns to decision diamond 432 of FIG. 4B for identification of the user's statement as a command. If at decision diamond 520 of FIG. 4H the user does not make a statement, the session keeps looping and analyzing whether a statement is given by the user.

Referring again to FIG. 4B, if the session is not within the repeat-phases mode as checked at decision diamond 512, then the session defaults back to step 420 of FIG. 4A to provide the capabilities menu for the responder. Again, as with many of the steps listed above, this is but one possible routing of the session. Accordingly, other alternate process steps are within the scope of the present invention. Finally, at any step within session 400, the user may end the session by hanging up.

Figure 5:
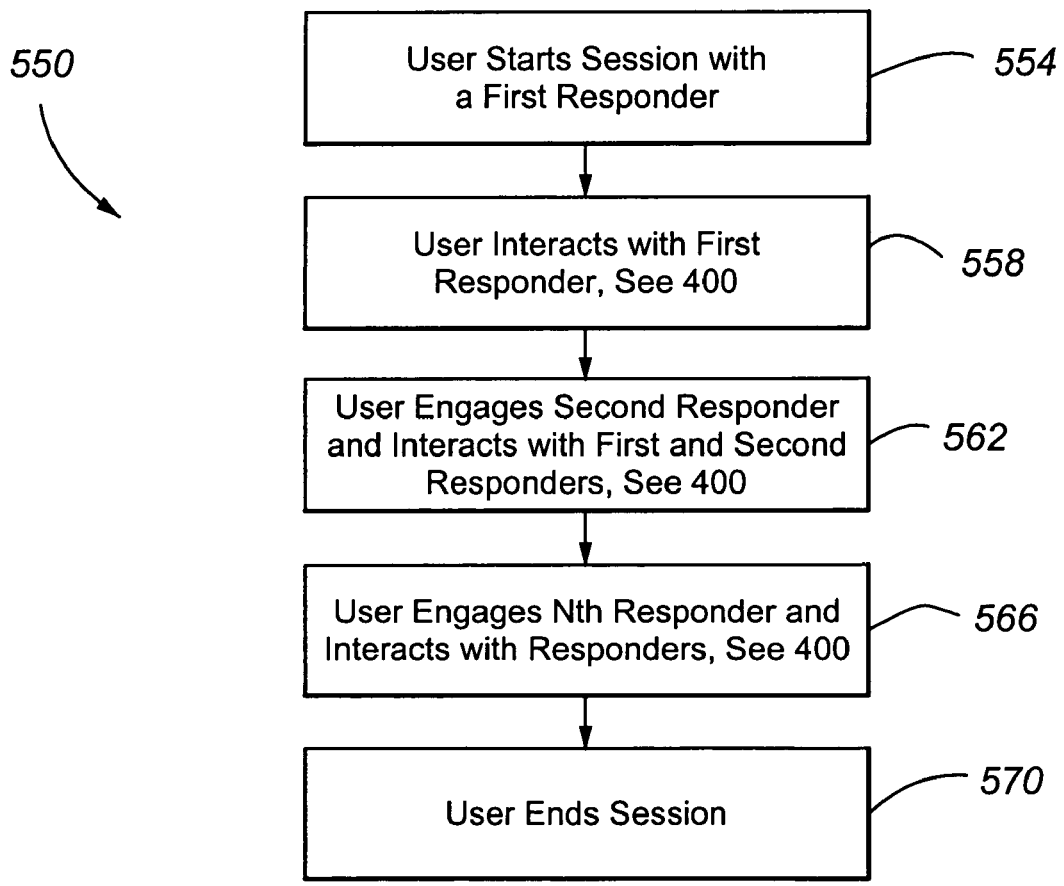
FIG. 5 is a flow diagram of a session wherein a user interacts with a plurality of responders.

Referring now to FIG. 5, the process of a session 550 is shown wherein a plurality of responders are used. As shown in step 554, the user starts the session with a first responder, such as Responder A. In step 558, the user works or interacts in the session 550 with the first responder of Responder A, and the user therefore, may move through any variety of the possible session options, including those given in session 400 as shown in FIGS. 4A-4H. In addition, in step 562 the user may engage a second responder, say Responder B, within session 550 by initiating a three-way conference. During the session 550, the user may interact both with Responder A and Responder B, thus practicing the features of the telephony system.

In accordance with embodiments of the present invention, any number of responders could be conferenced into a single call scenario; however, the responders should each comprise a unique identity and network address. In accordance with embodiments of the present invention, the various responders may also comprise a different voice and/or a different pitch that assists the user in listening and differentiating the identity of a responder as it speaks. Accordingly, each responder is preferably a multi-channel voice application with a particular voice, name, and network address. A typical deployment might have a dozen or so responders listed in the phone book. A large corporation might have a dozen per geographic location, and any user may dial any responder. Therefore, a user can practice setting up calls where the responders are located in various corporate offices, including outside the country of the user. Thus, for example, a user can practice setting up a conference call with multiple domestic and international participants.

Referring again to FIG. 5, in step 566, the user engages one or more additional responders, shown as an $n^{th}$ responder in step 566. In accordance with embodiments of the present invention, using the recognizer agent 320, the responders ignore key words that are given as prompts in the responder announcements, such as instructions on taking a break, while correctly identifying these same key words, token instructions, or commands when spoken by the user. Here, the detection protocol or recognizer agent 320 is using not only matching words, but potentially timing, pitch, and duration of the sounds to discern whether a machine responder is speaking or whether the user is speaking. In at least one embodiment, this can be done by training the recognizer agent 320 with the announcement and throwing out "perfect-match" utterances, such as provided by Responder N, when heard by Responders A and B. Thus, embodiments of the present invention discriminate between exact-match recognition instructions that are to be ignored, and near-match recognition commands or token instructions by the user that are to be acted upon. Therefore, a first decision outcome will be undertaken if the recognizer agent 320 determines that a fellow responder spoke, and a second decision outcome will be undertaken if the recognizer agent 320 determines that the user spoke. A novel aspect of the present invention comprising the trainer/exerciser is that it allows the user to access a plurality of responders 312*a-n* during the same practice session, wherein the plurality of responders 312*a-n* are all responsive to the user, but yet are not responsive to each other by talking over a fellow responder. Alternate embodiments of the present invention may utilize Dual Tone Multi-Frequency or DTMF instead of voice recognition. Whether through voice recognition or an alternate process such as DTMF, the user interacts with the responders 312*a-n* to practice features of the telephony system, wherein practice efforts may include adding and dropping, call backs, and other basic features, including the features described above in session 400. In addition, as noted above, customized responders can be provided for allowing training using advanced features of particular telephone systems, such as whisper mode and sub-conferencing.

Referring again to FIG. 5, as noted above, in step 566, the user engages one or more additional responders and practices whatever features through the trainer/exerciser as the user may decide to try. Finally, at step 570, the user ends the session 550, such as by hanging up.

Referring now to Table 1 provided below, an example scenario is provided of a session with two responders, namely, Responder A and Responder B. The example scenario includes information related to a separate aspect of the invention directed to providing a transcript of the session using a correlator feature, as described below. The example scenario illustrates that the user is able to call first Responder A and second Responder B, and practice the features of the telephony system, including the conference call feature whereby the user first calls Responder A, then adds Responder B, such as would be done in a real-life situation to initiate a three-party conference call.

TABLE 1

EXAMPLE SCENARIO

| User<br>Key:<br>USER VOICE: all caps | Responder A<br>Key:<br>*Responder A voice*: italics | Responder B<br>Key:<br><u>Responder B voice</u>:<br>underlined |
|---|---|---|
| Launch call to Responder A<br>Hear Ringback<br>See Display<br>Hear Greeting | Analyze incoming call<br>information<br>Answer Call. Send Transcript-<br>Expected to Correlator.<br>*"Hello, You've reached*<br>*Responder A."*<br>*"My display shows your call*<br>*came from [Displayname] at*<br>*[Received Address]."*<br>*"I will interact with what you*<br>*say. If you want me to stop, just*<br>*say 'Take a Break'. To get my*<br>*attention again say 'Who's on*<br>*the call.' Or 'Responder A*<br>*only.'"*<br>*"I can help you exercise many*<br>*features of your phone such as*<br>*Hold, Conference, Drop, and*<br>*Transfer. I can call you back. I*<br>*can also exercise advanced*<br>*features such as Sub-conference*<br>*and Whisper." "You may*<br>*always say 'What can you do?'"*<br>*"I will now repeat your phrases*<br>*to determine the quality of this*<br>*connection. Later you will*<br>*receive by voicemail a summary*<br>*transcript of this call."*<br>*"Remember, to get me to stop*<br>*say 'take a break'."*<br>*"Try saying 'Hello'."* | |
| "HELLO"<br>"HOW ARE YOU"<br>"TAKE A BREAK" | *"Hello"*<br>*"How are you"*<br>*"OK, I'll be quiet until I hear*<br>*'Who's on the Call' or*<br>*'Responder A only'."* | |

TABLE 1-continued

EXAMPLE SCENARIO

| User<br>Key:<br>USER VOICE: all caps | Responder A<br>Key:<br>*Responder A voice*: italics | Responder B<br>Key:<br>Responder B voice:<br>underlined |
|---|---|---|
| "GREAT. ARE YOU SURE?"<br>"YOU REALLY AREN'T GOING TO REPEAT WHAT I SAY?"<br>"OK, NOW I WILL CONFERENCE ON ANOTHER RESPONDER"<br>Conference-button;<br>Dial Responder B;<br>Conference-button;<br>Hear Ringback<br>See Display<br>Hear Greeting | | Analyze Incoming Call information<br>Answer Call. Send Transcript-Expected to Correlator.<br>"Hello. You've reached Responder B."<br>"My display shows your call came from [Displayname] at [ReceivedAddress]."<br>"I will interact with what you say. If you want me to stop, just say 'Take a Break'. To get my attention again say 'Who's on the call.' Or 'Responder B only.'"<br>"I can help you exercise many features of your phone such as Hold, Conference, Drop, and Transfer. I can call you back. I can also exercise advanced features such as Sub-conference and Whisper." "You may always say 'What can you do?'"<br>"I will now repeat your phrases to determine the quality of this connection. Later you will receive by voicemail a summary transcript of this call."<br>"Remember, to get me to stop say 'take a break'."<br>"Try saying 'Hello'." |
| "WHO'S ON THE CALL"<br>"TAKE A BREAK" | *"Responder A is on the call"*<br>*"OK, I'll be quiet until I hear 'Who's on the Call' or 'Responder A only'".* | "Responder B is on the call"<br>"OK, I'll be quiet until I hear 'Who's on the Call' or 'Responder B only'". |
| Hangup | Transcript is sent to correlator | Transcript is sent to correlator |

In accordance with embodiments of the present invention, a random back-off interval is used in a barge-in situation to keep multiple responders from talking over each other. This forces the responders to take turns in a conference call situation, such as, for example, when the user asks for a "roll call" of the call participants. The example scenario provided in Table 1 includes the user asking for a roll call after Responder B has been added. Here, the random back-off interval is used to allow Responder A to first respond, and then allow Responder B to subsequently respond. In addition, the random back-off interval is also used when the responders each acknowledge the user's command to "take a break" at the end of the practice session. Once the channel is quiet for the back-off interval, then a responder may talk providing that the channel stays clear.

As noted above, and in accordance with embodiments of the present invention, a correlator agent 328 may be provided as an optional feature to the trainer/exerciser. The correlator agent 328 serves to compare and compile reports from the responders and match them temporally, and then summarizes the aggregate functionality with a commentary voice. Thus, at the end of the session, the correlator feature allows the user to review the practice session and discern information regarding characteristics of the training/exercising session. In accordance with embodiments of the present invention, the correlator provides a document, transcript and/or recording in some type of media to the user. As for example, the correlator may provide an email transmission to the user with a transcript summary that summarizes and combines the experience of the user with the experience of each of the responders. Alternatively, the correlator may provide a voice mail recording of the practice session. In accordance with embodiments of the present invention, transcripts may be provided as XML files that contain a full audio recording interleaved with timestamps and announcement markers for the commands or token instructions, and actions of the responders. Accordingly, the correlator receives transcripts from all of the responders that were engaged in any given session. It determines that there are multiple transcripts for the session if the responders relate to the same user and overlap in time. In accordance with embodiments of the present invention, a correlation function merges all of the recordings into a single transcription stream while comparing and measuring the relative strengths of the audio streams. In addition, it preferably uses an analysis commentary voice to summarize the resulting transcript. The resulting transcript is then sent to the user.

A possible difficulty for a correlator is the potential absence of a consistent call identifier at each responder that ties the independent responder transcriptions with phone transcriptions. A solution to this problem is to use the Caller-ID number of the user as the key, and to have the correlator look for transcriptions from this number that overlap in time. If for some reason the user identity cannot be determined from the available information, then the trainer/exerciser with the correlator feature must prompt the user for their callback number, or for a proper location to forward the correlated transcript summary. For example, if the email or voice mail network address cannot be determined from the callback number, then the correlated transcript summary may be delivered in a call/answer scenario where the user receives a call that provides the recorded practice session for the user to listen to and review.

An example of a written transcript of a correlated session is provided in Table 2 below. In the example provided, the left hand column provides a "commentary voice" that identifies generally what occurred during the practice session. As for example, the commentary voice provides information regarding the date and time of the call, as well as information pertaining to what was heard by a responder, or that silence occurred for a certain period time. The right hand column provides a running transcript of the discussion held during the practice session. For example, after the commentary voice notes that "Responder A heard . . . ," then the right hand column lists the actual words heard by Responder A. If this transcript was provided in a voice mail message format as audio, the commentary voice would actually be audio statements heard by the user when the user listened to the audio transcript of the sessions. In addition, the listener would be able to hear what was heard by the responder or responders. For example, the user could listen to how the user's own voice was actually heard by the responder. In addition, the user could hear what Responder A heard when the user was conferencing in Responder B. This type of audio playback of the session offers the user the advantage of actually hearing their own voice, including perhaps awkward pauses, back-ground noise being picked up by a speaker phone, line quality, etc. As a further example, the user can practice the mute, hold, drop, and add features common to all telephony systems with the ability to hear how performing such functions was perceived by the one or more responders. In addition, for embodiments of the present invention that are customized for a particular telephone system, the user could practice more advanced features including sub-conferencing, whisper and other advanced telephony system functions, also with the ability to hear the practice session. Accordingly, the user can gain significant information and confidence in using the telephony system by being able to perform a personal review of their practice session from the perspective of the one or more of the responders, wherein the responder's transcript is provided by the correlator agent to the user.

TABLE 2

CORRELATED SESSION

| Commentary Voice Key: Commentary Voice: normal text | Transcript Playback Key: USER VOICE: all caps *Responder A voice*: in italics Responder B voice: underlined |
|---|---|
| "This transcript began with a call to Responder A from [User Displayname] at [Received Address] at [hh:mm:ss] [Day of Week] [Month] [Day Of Month]." | |
| "Responder A-only heard . . . " | *"Hello, You've reached Responder A."* *"My display shows your call came from [User Displayname] at [Received Address]."* *"I will interact with what you say. If you want me to stop, just say 'Take a Break'. To get my attention again say 'Who's on the call.' Or 'Responder A-only'"* *"I can help you exercise many features of your phone such as Hold, Conference, Drop, and Transfer. I can call you back. I can also exercise advanced features such as Sub-conference and Whisper."* *"You may always say 'What can you do?'"* *"I will now repeat your phrases to determine the quality of this connection. Later you will receive by voicemail a summary transcript of this call"* *"Remember, to get me to stop say 'take a break'."* *"Try saying 'Hello'"* "HELLO" *"Hello"* "HOW ARE YOU" *"How are you"* "TAKE A BREAK" |

TABLE 2-continued

CORRELATED SESSION

| Commentary Voice Key:<br>Commentary Voice: normal text | Transcript Playback Key:<br>USER VOICE: all caps<br>*Responder A voice*: in italics<br>Responder B voice: underlined |
|---|---|
| "Responder A heard the token 'take a break' and then heard . . ." | *"Ok, I'll be quiet until I hear 'Who's on the Call' or 'Responder A-only'".*<br>"GREAT. ARE YOU SURE?"<br>"YOU REALLY AREN'T GOING TO REPEAT WHAT I SAY?"<br>"OK, NOW I WILL CONFERENCE ON ANOTHER RESPONDER." |
| "Responder A detected silence for 10 seconds."<br>"Responder B jointed the call. All responders heard . . ." | |
| | "Hello, You've reached Responder B."<br>"My display shows your call came from [User Displayname] at [Received Address]."<br>"I will interact with what you say. If you want me to stop, just say 'Take a Break'. To get my attention again say 'Who's on the call.' Or 'Responder B-only'"<br>"I can help you exercise many features of your phone such as Hold, Conference, Drop, and Transfer. I can call you back. I can also exercise advanced features such as Sub-conference and Whisper." "You may always say 'What can you do?'"<br>"I will now repeat your phrases to determine the quality of this connection. Later you will receive by voicemail a summary transcript of this call"<br>"Remember, to get me to stop say 'take a break'."<br>"Try saying 'Hello'"<br>"TAKE A BREAK" |
| "All responders heard the token 'take a break' and then heard . . ." | "Ok, I'll be quiet until I hear 'Who's on the Call' or 'Responder B-only'".<br>"WHO'S ON THE CALL" |
| "All responders heard the token 'Who's on the call' then heard . . ." | *"Responder-A is on the call"*<br>"Responder-B is on the call"<br>"TAKE A BREAK" |
| "All responders heard the token 'Take a break' and then heard . . ." | "Ok, I'll be quiet until I hear 'Who's on the Call' or 'Responder B-only'"<br>*"Ok, I'll be quiet until I hear 'Who's on the Call' or 'Responder A-only'"* |
| "All Responders Detected Hangup" | |

Figure 6:
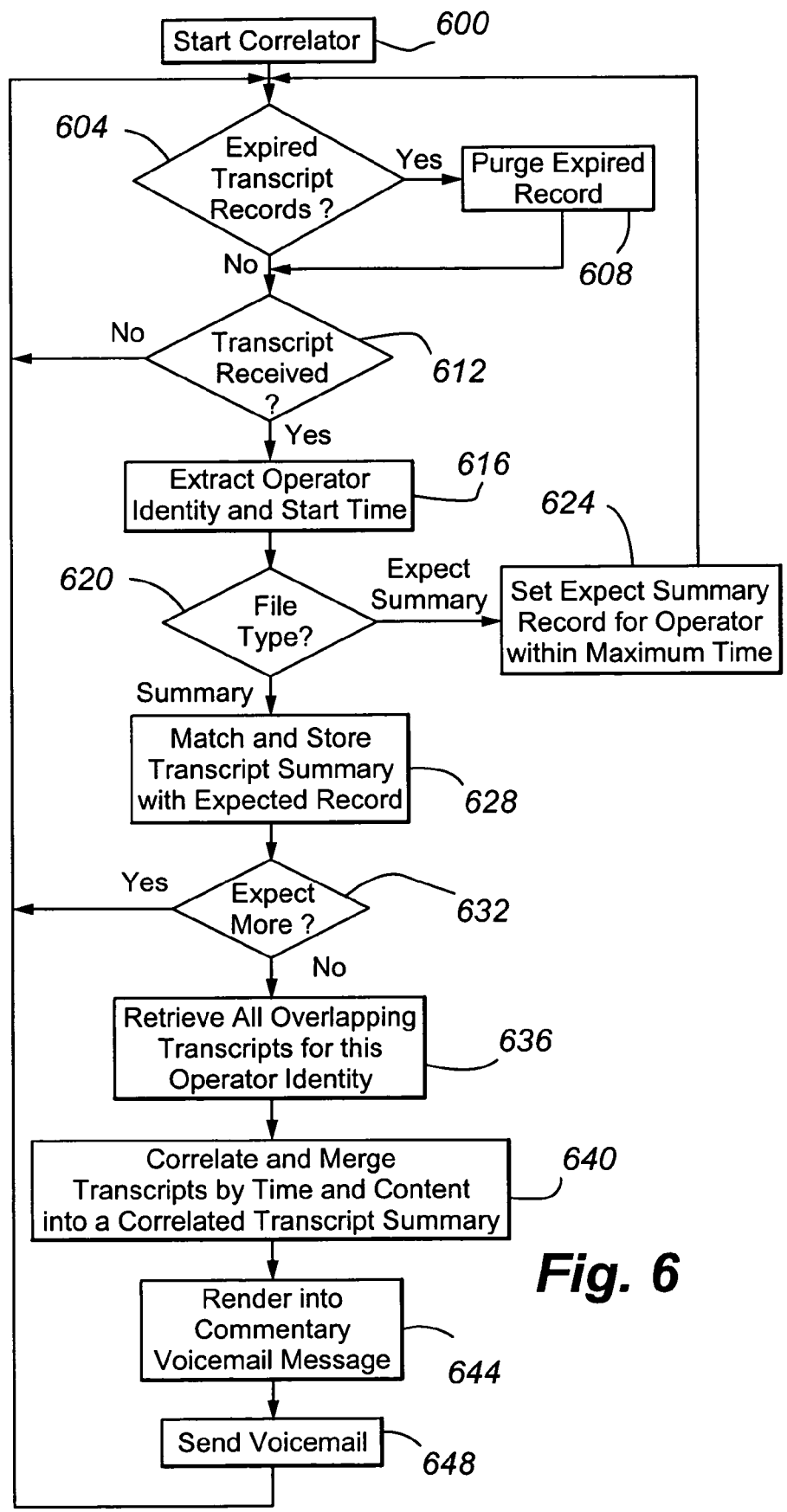
FIG. 6 is a flow diagram of a session in accordance with embodiments of the present invention using a correlator.

Referring now to FIG. 6, and in accordance with embodiments of the present invention, one possible process by which the correlator agent 328 operates is depicted. In step 600, the correlator agent is started, such as by the user providing instruction that a transcript of the session is desired, or by a default setting where the correlator is always used to provide a transcript, regardless of whether the user desires to review it. Responders send indications to the correlator to expect a summary transcript at the beginning of a session, then send a transcript of the session later when the session ends. The correlator agent receives transcripts from all responders, holds them in queue until it determines that all related tran†scripts for a call have likely been received, then produces a summary transcript. In decision diamond 604, an evaluation is conducted as to whether expired transcript records exist. In step 608, if expired summary records exist, the records are purged. In decision diamond 612, the correlator agent evaluates whether a transcript file was received. If it is received, then in step 616 the correlator extracts the user or operator identity and start time that is associated with the transcript received. In decision diamond 620, the file type is evaluated to determine if it is a summary transcript, or just an indication to expect a summary transcript later. If a summary record is expected, then in step 624 the correlator agent establishes a time within which to expect a summary record for the operator. The correlator agent then proceeds to continue to loop to receive and expire summary transcripts for the operator and evaluate whether a summary file is received for the operator. If a summary transcript is received at decision diamond 620, then at step 628 the transcript summary is matched and stored with the expected record. At decision diamond 632, the correlator agent assesses whether it is to expect more transcripts. If more are expected, then the correlator agent loops and looks for additional transcripts. If more are not expected, then at step 636 all of the overlapping transcripts with regard to time and the common operator are retrieved. In step 640, the transcripts are correlated and merged by time and content with commentary narration applied to summarize the entire call and produce a final correlated transcript summary. In accordance with embodiments of the present invention, when multiple responders hear the same content, the loudest content is selected for inclusion in the summary transcript. If there is a substantial difference in the loudness or signal to noise ratio of the captured streams, then the commentary voice can also announce these observations prior to playing the stream segment. In step 644, the correlator renders the final correlated transcript summary into a form suitable for deliver to the user as a voicemail message. In step 648, the voice mail correlated transcript summary is sent to the user.

In order to provide an effective correlator, the correlator agent 328 must be available to all responders, or at least all responders designated for being capable of participating with the correlator. If traffic dictates the use of multiple correlators, then the selection of the correlator may be determined by the identity of the user. In accordance with embodiments of the present invention, a correlator might be co-located in the same voice mail system that contains the user's mailbox. In addition, although a responder session is launched by in incoming call to the responder, the summary transcription may persist past the termination of the incoming call to include any number of call-back calls or transfer calls made with the same user identity.

Part of a network includes traversing paths through different switches and gateways. Preferably, responders will employ digital file transfer to send their summary transcripts to the correlator. However, this may not always be possible. Depending upon the system employed, this means that the responders may not be able to depend on anything but an audio path with the scenario participants, and even this path may be trans-coded and processed. Accordingly, non-announced parts of the transcription are preferably correlated using DSP techniques, and the captured recording is played back in its entirety instead of reducing the scenario to just announcement identifications and token instructions.

The correlator feature has application to building confidence in relatively seldom used telephony features, as for example, the whisper function. The whisper function is a feature where a first principal person involved in a call can listen to third party (such as a secretary or assistant) in the headset without the second principal person involved in the call hearing the comments made by the third party. As an example scenario, the first person would like to get the important information from their assistant without interrupting the call, and without the second person hearing the comments of the assistant. Depending upon the subject matter of the call, the ability to properly operate such a feature needs to be trusted before either the first person or the assistant are going to feel confident in using the whisper function. Embodiments of the trainer and exerciser allow this feature to be practiced by designating a first responder to conduct a whisper message to the user, while at least a second responder is already on the line. Subsequently, with the correlator feature the user can later listen to what the second responder heard as the whisper function was being practiced. Additional discussion of a practice session using the whisper feature with the trainer and exerciser of the present invention is provided further below.

In accordance with embodiments of the present invention, a coaching agent may be provided as an optional feature to the trainer/exerciser. The coaching agent would comprise instructions for a particular telephony system, and thereby serve to assist the user in both learning the telephony system and/or navigating the trainer/exerciser. In accordance with embodiments of the present invention, the coaching feature may be a user manual, or more preferably, a soft-phone screen wizard or an audio coach built into the telephone or served from a central server to a specially designed telephone.

Referring again to Table 1, the role of the coach and responder are blended in the exerciser scenario. For example, during the introduction, Responder A explains or coaches the user by stating that the user may get the responder to stop by saying the instruction token "take a break." However, because the responder does not know the intention of the user, a minimal amount of coaching is possible, and would typically be limited to a few suggested instruction tokens for the user to control the responder during the exerciser/training session. In addition, coaching is further limited because the responder does not know what type of user interface is being used, and the responder cannot prompt the user midway through a transfer, because the responder does not know what the user is doing, and more fundamentally, because the responder has been functionally set aside and relegated to a waiting mode as the user attempts the next effort. These difficulties, however, can be addressed by placing additional coaching functions in the phone, wherein the coaching can continue even when the user is stalled in the middle of an operation, such as a transfer, because the user does not know what to do next.

In general, the coaching must be specific to the phone device in use, and not the number that was used to call the responder. However, putting the coaching in the phone is generally too complex for the phone. Accordingly, a bi-directional coaching real-time transport protocol stream interface and a third-party call control monitor interface may be supported on the phone, thereby allowing coaching and monitoring of user input by a network-side server.

Figure 7:
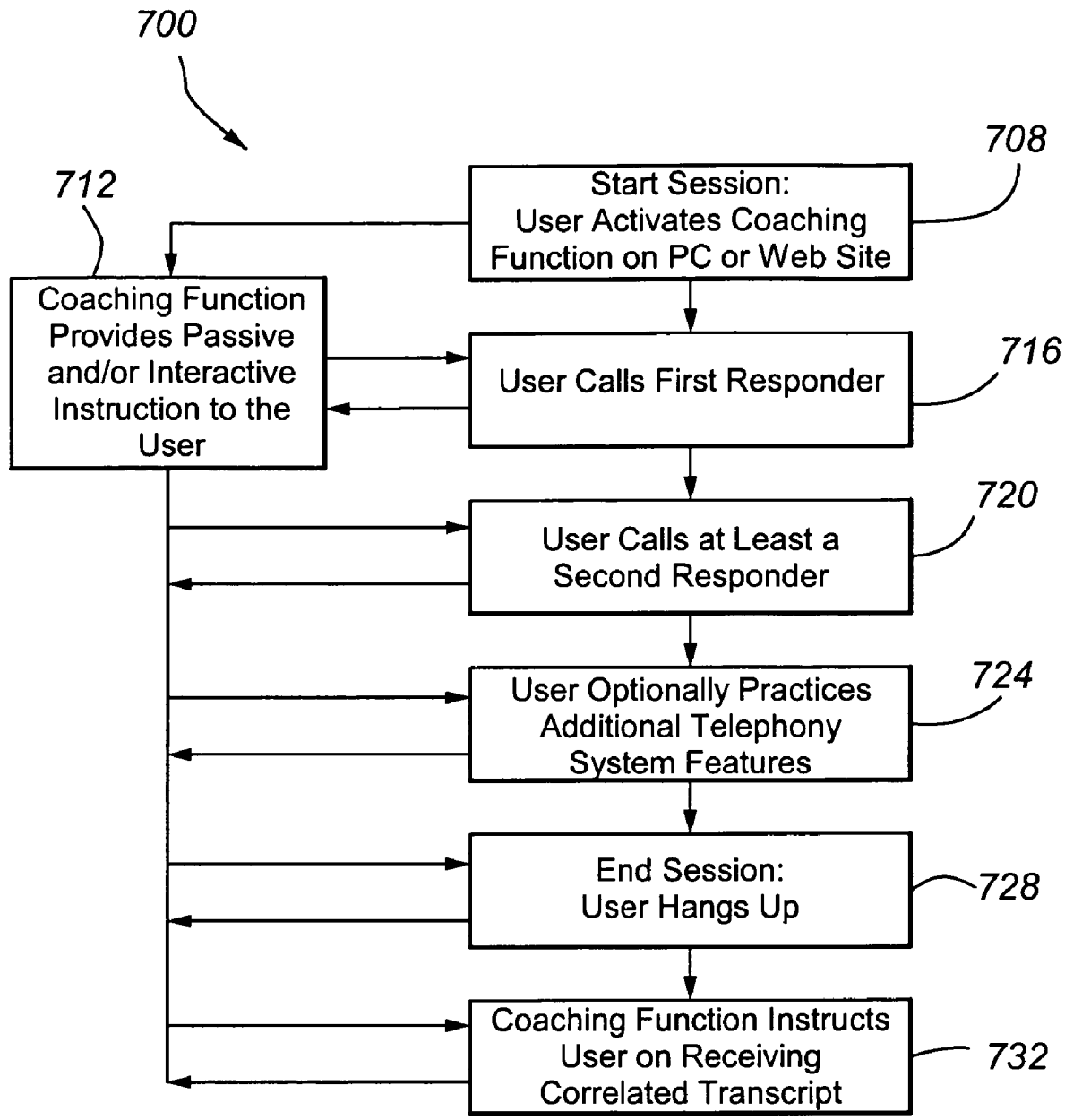
FIG. 7 is a flow diagram of a session in accordance with embodiments of the present invention using a coaching function.

Referring now to FIG. 7, a session 700 with coaching is shown. In step 708, the user begins the session, such as on a PC having a softphone, by activating the coaching feature of the trainer/exerciser. This step may comprise running software on the PC or accessing a web site for tutorial or coaching assistance. In step 712, the coaching function provides instructions to the user. The coaching function may be interactive and/or it may be passive. For example, the coaching function may ask what the user wants to do from a menu of possible options that the user can choose. Alternatively, the coaching function may just provide information on possible alternatives and not request the user to choose. In yet another alternative, the coaching function may provide suggestions. For example, the coaching function may suggest calling a first responder. In step 716, the user calls a first responder. In accordance with embodiments of the present invention, the coaching agent that is loaded on, for example, a PC, may monitor the activities of the user and actively step the user through a practice session, and as a further example, the coaching function may offer suggestions and options for the user. For example, the coaching function may suggest practicing performing a conference call by suggesting that the user call a second responder. In step 720, the user calls at least a second responder. In step 724, the user can practice various available features of the telephony system, and the coaching function can assist by offering suggestions and instruction to the user. In step 728, the user ends the practice session by hanging up. In step 732, the coaching function can continue to offer information to the user, such as how to obtain a transcript, or where to look for the transcript. In addition, the coaching function can suggest further practice sessions to learn other telephony system features. Thus, the coaching function not only operates during an active session, but may also provide subsequent assistance to the user.

In accordance with embodiments of the present invention, the coaching function may be enabled during a live call placed by the user. For example, if the user is calling from a softphone, the user could obtain step by step instructions from the coaching function to assist with making a conference call. Here, the user would chose the type of call that the user desires to make, and then the coaching function would provide instruction to the user to do step 1, step 2, etc. In addition, the coaching function could be enabled during the middle of a call to coach the user to utilize a specific feature of the telephony system, such as how to transfer a call to another employee.

Figure 8:
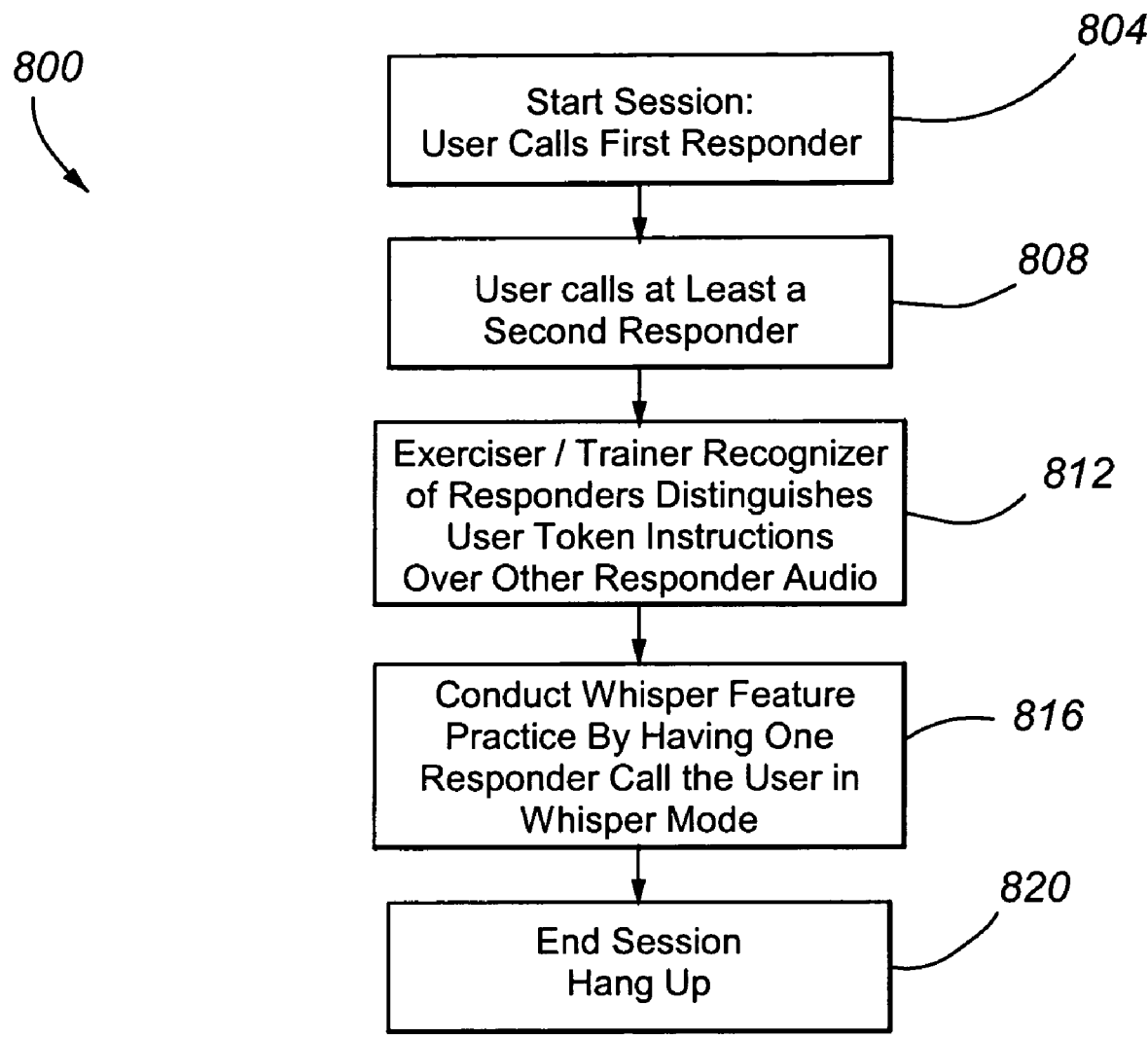
FIG. 8 is a flow diagram of a session in accordance with embodiments of the present invention wherein a whisper feature is practiced.

Referring now to FIG. 8, and in accordance with embodiments of the present invention, a session 800 using a whisper function is shown. As described above, the whisper function is a feature where a first principal person involved in a call can listen to third party (such as a secretary or assistant) in the headset without the second principal person involved in the call hearing the comments made by the third party. The exerciser trainer allows this feature to be practiced by designating a first responder to conduct a whisper message to the user, while at least a second responder is already on the line. In step 804, the user initiates the session 800 by calling a first responder. In step 808, the user calls at least a second responder. In step 812, the recognizer agent 320 distinguishes the user command or token instruction token over the audio of the other responder. More particularly, and as for example, the first responder is able to discern the difference between the second responder providing an introduction to the user and the user stating a command requiring action by the first responder. In step 816, the user commands one of either the first or second responders to make a whisper call to the user. Finally, in step 820, the user ends the session 800 by hanging up. This example session 800 can then be reviewed by the user if the user obtains a copy of the transcript of the session 800, as would be prepared if the correlator feature was enabled. With the correlator feature, the user can then listen to what the non-whispering responder heard as the whisper function was being practiced.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance or achieving ease and or reducing cost of implementation.

The foregoing discussion of the invention has been presented for purposes of illustration and description. The foregoing is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those skilled in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of a user practicing a telephony system feature on a telephony system, comprising:

receiving, at a first computer automated responder interconnected to the telephony system, a request to initiate a first telecommunication session;

receiving, at a second computer automated responder interconnected to the telephony system, a request to initiate a second telecommunication session, wherein the first and second telecommunication sessions are conference together in a common telecommunication session;

receiving, at the first and second computer automated responder, a token instruction directed to at least one of the first and second computer automated responders, where the token instruction is given within the common telecommunication session;

determining, at the first computer automated responder, whether the token instruction originated from the second computer automated responder or the user;

in response to determining whether the token instruction originated from the second computer automated responder or the user, applying the following rules at the first computer automated responder;

when the token instruction originated from the user, determining whether the token instruction is directed to the first computer automated responder and, in response to determining that the token instruction is directed to the first computer automated responder, the first computer automated responder taking an action specified by the token instruction; and when the token instruction originated from the second computer automated responder, not taking the action specified by the token instruction.

2. The method as claimed in claim 1, further comprising at least one of: (a) providing a recording of the common telecommunication session, and (b) providing a transcript of the common telecommunication session.

3. The method as claimed in claim 2, wherein at least one of the recording and the transcript is provided by a correlator agent interconnected to the telephony system, the correlator agent storing information provided by the user and the first and second computer automated responders.

4. The method as claimed in claim 1, further comprising receiving instruction from a coaching agent, the coaching agent comprising software monitoring at least a portion of the user's interaction with the telephony system.

5. The method as claimed in claim 1, further comprising practicing telephony system features selected from the group consisting of conference calls, whisper calls, private sub-conference calls, dropping, adding, muting, transferring, forwarding, answering, and holding.

6. A method of a user practicing a telephony system feature on a telephony system, comprising:

conferencing together in a communication session at least first and second computer automated responders and a user via a telephony system, wherein the first and second computer automated responders distinguish whether a token instruction transmitted during the communication session is provided by the user or the other of the first and second computer automated responders, wherein the first computer automated responder applies the following rules in response to determining whether the token instruction is provided by the user or the second computer automated responder: (1) when the token instruction originated from the user, determining whether the token instruction is directed to the first computer automated responder and, in response to determining that the token instruction is directed to the first computer automated responder, the first computer automated responder taking an action specified by the token instruction; and (2) when the token instruction originated from the second computer automated responder, the first automated responder not taking the action specified by the token instruction, further wherein the first and second computer automated responders communicate with a correlator agent interconnected to the telephony system, the correlator agent compiling information provided by the user and the first and second computer automated responders; and the correlator agent providing the compiled information to the user after an end of the communication session.

7. The method as claimed in claim 6, further comprising reviewing the compiled information by listening to a recording of the practice session.

8. The method as claimed in claim 6, further comprising reviewing the compiled information by reading a transcript of the practice session.

9. The method as claimed in claim 6, further comprising providing a token instruction to at least one of the first and second computer automated responders, wherein the first and second computer automated responders distinguish between the token instruction provided by the user, and the same token instruction provided by the other of the first and second computer automated responders.

10. The method as claimed in claim 6, further comprising receiving instruction from a coaching agent, the coaching agent comprising software monitoring at least a portion of the user's interaction with the telephony system.

11. The method as claimed in claim 6, further comprising practicing telephony system features selected from the group consisting of conference calls, whisper calls, private sub-conference calls, dropping, adding, muting, transferring, forwarding, answering, and holding.

12. A telephony trainer and exerciser system for allowing a user to practice features of a telephony system, the telephony trainer and exerciser accessed by the user using an access node interconnected to the telephony system, the trainer and exerciser system comprising:

a plurality of automated responders in communication with the telephony system and available for conferencing into a communication session by the user using the access node; and for each of the plurality of automated responders, a recognizer agent for distinguishing a token instruction as being one of a voiced user command and a voiced statement of at least one of said plurality of automated responders, wherein the voiced user command and the voiced statement are each transmitted during a common communication session in which a first and second automated responder are conferenced with the user using the access node, wherein the first computer automated responder applies the following rules in response to distinguishing whether the token instruction is provided by the user or the second computer automated responder: (1) when the token instruction originated from the user, determining whether the token instruction is directed to the first computer automated responder and, in response to determining that the token instruction is directed to the first computer automated responder, the first computer automated responder taking an action specified by the token instruction; and (2) when the token instruction originated from the second computer automated responder, the first automated responder not taking the action specified by the token instruction.

13. The telephony trainer and exerciser system of claim 12, wherein the at least one of said plurality of responders will perform a first function for a first token instruction provided by the user, and wherein the at least one of said plurality of responders will not perform the first function for the same first token instruction provided by at least a second of said plurality of responders.

14. The telephony trainer and exerciser system of claim 12, wherein the access node comprises a softphone on a personal computer.

15. The telephony trainer and exerciser system of claim 12, wherein the recognizer agent comprises software running on a server interconnected to the telephony system.

16. The telephony trainer and exerciser system of claim 12, wherein the at least one of said plurality of automated responders and a second the plurality of automated responders are located on different servers.

17. The telephony trainer and exerciser system of claim 12, wherein the different servers are located at different geographic locations.

18. The telephony trainer and exerciser system of claim 12, wherein the recognizer agent comprises software running on computer interconnected to the telephony system.

19. The telephony trainer and exerciser system of claim 12, wherein the access node comprises a phone interconnected to the telephony system.

20. The telephony trainer and exerciser system of claim 12, further comprising a correlator agent in communication with the plurality of responders, wherein the correlator agent assembles a transcript of a practice session conducted between the user and at least one of the plurality of responders.

21. The telephony trainer and exerciser system of claim 12, further comprising a coaching agent in communication with the access node of the user, the coaching agent providing at least a first instruction to the user for using the telephony system.

22. The telephony trainer and exerciser system of claim 12, wherein the user practices a conference call by contacting at least two of the plurality of responders.

23. The telephony trainer and exerciser system of claim 22, wherein the user practices a whisper function having a first responder of the plurality of responders conduct a whisper call to at least one of the user or second responder of the plurality of responders.

24. The telephony trainer and exerciser system of claim 12, wherein the user practices telephony system features selected from the group consisting of conference calls, whisper calls, private sub-conference calls, dropping, adding, muting, transferring, forwarding, answering, and holding.

25. The method as claimed in claim 1, wherein the token instruction is a voiced instruction and the first computer automated responder employs voice recognition to determine whether the token instruction originated from the second computer automated responder or the user.

26. The method as claimed in claim 25, wherein the first computer automated responder responds to the token instruction according to the following:
   (a) if the token instruction is an exact match to a predetermined voice command, it is determined that the token instruction originated from the second computer automated responder, and if the token instruction is a near match to the predetermined voice command, it is determined that the token instruction originated from the user; and
   (b) using voice recognition to process the token instruction using at least one of matching words, timing, pitch, and duration of sounds.

27. The method as claimed in claim 1, wherein the token instruction is directed to both the first and second computer automated responders, and wherein in response the token instruction, the first automated computer responder transmits a first voiced message, and following the first voiced message, the second automated computer responder transmits a second voiced message after a predetermined back-off interval has expired.

* * * * *